July 28, 1964 G. A. JALLEN 3,142,817
INFORMATION COMPARISON CIRCUITS
Filed Feb. 12, 1958 2 Sheets-Sheet 1
Fig. 1.
| P | WORD | | | | | | |
|---|---|---|---|---|---|---|---|
| – | $2^5$ | $2^4$ | $2^3$ | $2^2$ | $2^1$ | $2^0$ | |
| 1 | 1 | 0 | 1 | 0 | 1 | 1 | 10 |
| 0 | 0 | 0 | 1 | 0 | 1 | 1 | 14 |
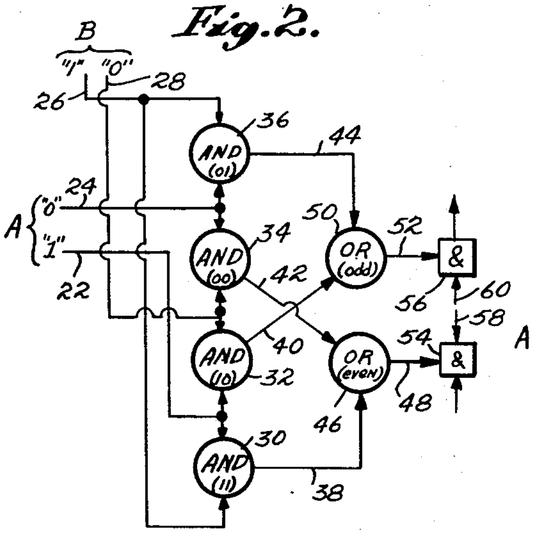
Fig. 2.
Fig. 3.
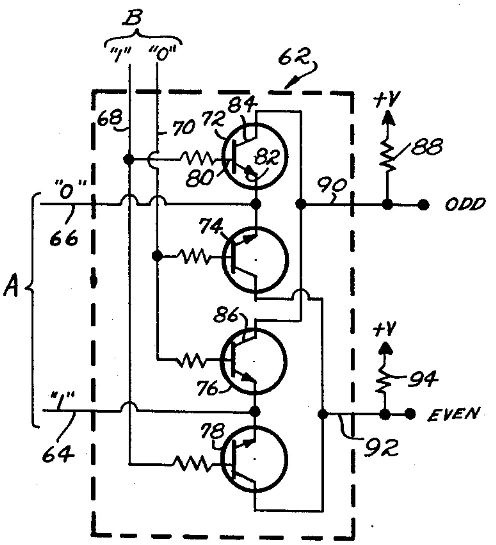
Fig. 3A.
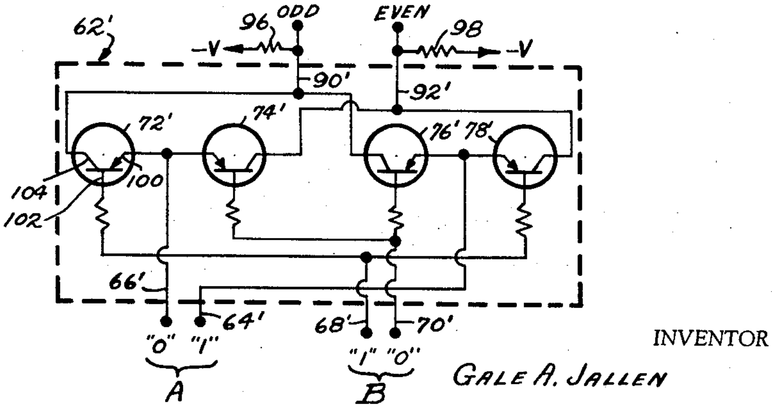
INVENTOR
GALE A. JALLEN
BY Cushman, Darby & Cushman
ATTORNEYS July 28, 1964 G. A. JALLEN 3,142,817

INFORMATION COMPARISON CIRCUITS

Filed Feb. 12, 1958 2 Sheets-Sheet 2

INVENTOR

GALE A. JALLEN

BY Cushman, Darby & Cushman

ATTORNEYS 3,142,817

INFORMATION COMPARISON CIRCUITS

Gale A. Jallen, St. Paul, Minn., assignor to Sperry Rand Corporation, New York, N.Y., a corporation of Delaware Filed Feb. 12, 1958, Ser. No. 714,890
12 Claims. (Cl. 340—146.2)

This invention relates to circuits for comparing at least two information signals as to their binary character and to circuits employing a plurality of such comparison circuits for generating a needed parity signal for a binary word, or for checking a parity signal and its associated binary word to determine if the parity and word representations are correct.

In the manipulation of signals representative of arbitrary codes in the well known notation scheme, a large number of electronic operations are performed to obtain a desired result. In such operations involving digital data processing and communication systems, it is often desirable to provide apparatus to detect errors at the earliest occurrence in the system. This not only saves valuable time but also many times affords the operator information as to the source of the error. Sources of errors may come from faulty system operation as caused by poor magnetic record mediums, poor signal recovery circuits, amplifier difficulties, faulty components, power transients, etc.

A large percentage of these errors may be conveniently checked during signal transfer within the system and at the time they occur by introducing a small amount of redundancy in the binary coded signals. A form of redundancy for error detection is disclosed by R. W. Hamming in an article entitled "Error Detecting and Error Correcting Codes" in the Bell System Technical Journal, volume 29, April 1950. According to Hamming a single binary digit (bit) is added to a binary code such that the number of binary one's in every binary code is always odd or always even, as desired. Hamming proceeded further in providing error correcting schemes in addition to the single parity bit error detector.

The parity check method is well adapted to binary coded numbers, as in binary coded decimal which encodes numbers having a radix 10 by breaking the numbers into the component powers to the base two. Alphanumeric codings utilizing six binary digits are conveniently checked by a seventh bit used to provide parity. In such a code the lower order four bits indicate among other things the decimal numbers 0–9 while the upper two significant digits indicate the interpretation of the lower order four bits, i.e., whether numeric (decimal), alphabetic, symbolic or another arbitrary definition. The seventh digit is used to make the total number of binary one's in the code character either odd or even, as is desired. In performing arithmetic on the code only the numeric representations need be used unless the system includes alpha-arithmetic such as used in the UNIVAC I.

Some of the parity generating decoding apparatus utilized heretofore have required a staticizing or storage unit in which to store each code character while the determination of the need for a parity bit is being made or determining the correctness of the code containing a parity bit. Other systems required the necessity of serializing the code to provide the parity checking and generating functions. Yet other systems required large amounts of components such as transformers, discharge devices and complex wiring to accomplish parity checking and generating.

While parity checking systems will detect an odd number of errors in an information word consisting of electrical signals, additional errors may be detected when two electronic signal representations of the information word are available and a bit comparison is made between the two representations. Thus in a data processing system wherein arithmetic or other information manipulation operations are performed twice to provide a check on the fidelity of the operations, it may be advantageous to make a bit comparison simultaneously with making a parity check on the electronic code. By making the bit comparison, a check of the likeness of the two representations is made; if the same error occurs in both signal representations the parity check may detect the error. If there are an even number of errors in one signal representation, the parity check will not detect the errors, while the bit comparison will detect this type of error if both signal representations do not contain the same errors.

According to the teachings of this invention four semiconductor elements, such as transistors, are interconnected to provide a comparison or modular circuit, hereinafter frequently referred to as a "module." By making interconnections of a plurality of these modules with data processing systems or electronic registers, parity generating and checking operations are performed. The parity checking module compares two binary inputs to provide a positive voltage on one of two lines. If the binary inputs are equal, a positive voltage is provided on a first output line, and a positive voltage is provided on a second line if the binary inputs are unequal. By connecting a plurality of these modules in series with binary code signals being applied to the modules in parallel, almost instantaneous parity checking and generating on the parallel binary inputs is performed. Two signal outputs are available, one indicative of an odd parity while the second is indicative of an even parity check. In addition to the parity check, a bit comparison of two signal representations may be performed by the above described connection of modules by taking the "0" signal representations from one set of signal representations of the code and comparing said "0" representations with the "1" representations from a second set of signal representations and substituting the latter signals for the parallel binary inputs to the parity checking apparatus and by comparing the odd parity signal with the even parity signal in an EXCLUSIVE OR circuit. If the odd parity signal is the same as the even parity signal, the two signal representations are unalike and an error is indicated, while the parity signals may be utilized as in the former connection of modules.

Therefore, it is the prime object of this invention to provide an improved comparison circuit utilizing four semi-conductor elements.

Another object of this invention is to provide a novel parity generator having simple electronic circuits that can operate at high speeds without the need for staticizing the signals representing the binary code while determining parity.

It is a further object of this invention to provide a relatively simple, inexpensive and efficient parity generator and checking circuit which determines the parity from the parallel signal representation of the code.

It is a further object of this invention to provide a parity generator and checking circuit which is modular in concept and construction.

It is a still further object of this invention to provide a parity checking circuit which makes a bit comparison of two signal representations of an electronic code simultaneously with making the parity check.

It is another object of this invention to provide a parity generator, a checking circuit, and a bit comparator circuit each of which utilizes only direct coupled transistor circuits.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 illustrates two binary codes with associated parity information for an odd parity check;

FIGURE 2 illustrates the truth function logical diagram performed by a comparison circuit in accordance with this invention;

FIGURES 3 and 3A illustrate comparison circuit embodiments of this invention;

Figure 4:
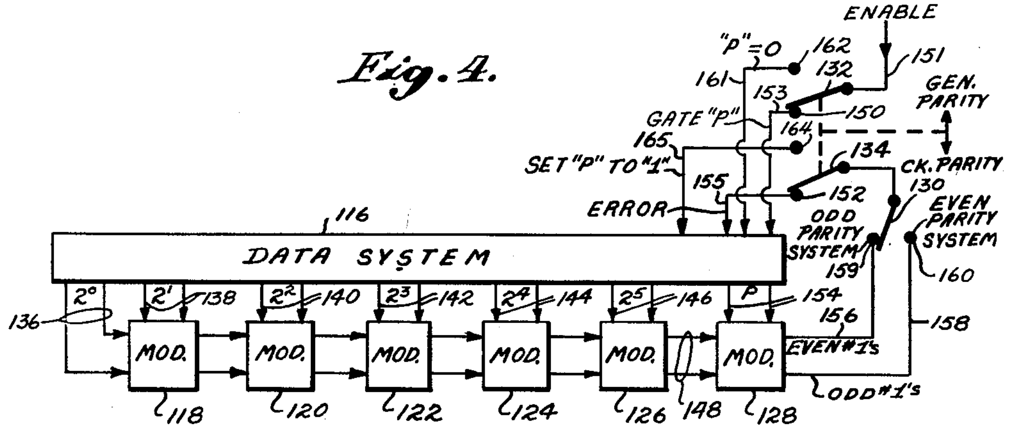
FIGURE 4 is a block diagram of a parity generator and checking circuit including a plurality of comparison circuits.

In FIGURE 1 binary word 10, including six binary digits in the $2^0$ to $2^5$ positions respectively, has four 1's and two 0's which requires a parity bit P of 1 to make the total number of 1's in the 7-bit code odd or a parity bit of 0 to make the total number of 1's in the 7-bit code even. Similarly, binary coded word 14 has an odd number of 1's (three 1's); therefore, the parity bit is a 0 to make the total number of one's in the complete code odd and would be a 1 to make the one's count even. Similarly, all code combinations in the word portions such as 10 or 12 determine whether or not the parity bit is a 1 or a 0. Further error detecting can be accomplished by adding additional parity bits as described by Hamming in the above referenced article.

In general a binary 1 is represented in digital systems by the presence of a pulse at a predetermined time on a predetermined wire while a binary 0 may be represented by the absence of a pulse or a pulse of opposite polarity to said binary one pulse at said predetermined time of said predetermined wire. A second way of representing digital information in the form of electrical pulses is to provide two wires, one for carrying the binary 1 pulses and one for carrying the binary 0 pulses. In this second method of representation a pulse on one of the two wires at a predetermined time is indicative that the information is a binary 1 while a pulse on the second wire is indicative of a binary 0. This invention utilizes the latter form of representation; however, it is to be understood that the checking circuit will operate equally well with digital systems utilizing either type of representation if conversion is employed with the former type. Conversion from one mode of representation to the other is very simple and well known in the art. One means of conversion from the former to the latter is accomplished by merely setting a flip-flop circuit according to the information content of the former indication and using both voltage levels from said flip-flop as indication in the latter representation. Conversion from the latter back to the former when needed may then be conveniently accomplished by using only one of the two pulses as an indication on a single line, as by utilizing one output from flip-flop as indication for both one and a zero—positive voltage for a one and a negative voltage for a zero.

FIGURE 2 shows the truth function or logical arrangement which provides a comparison of two binary digits A and B to ascertain whether there is an even or an odd number of 1's in the two binary digits. The contents or value of the binary digits is indicated by a voltage, current or impedance in or on one of the two lines associated with each digit. For purposes of explanation it will be assumed that a relatively high amplitude positive or negative voltage is indicative of a value while a relatively low amplitude positive or negative voltage is indicative of absence of said value. Thus a high voltage on line 22 would indicate that digit A has the value "1" whereas a high voltage on line 24 would indicate that digit A has the value of "0." Similarly, a high voltage on line 26 can indicate a value of "1" in digit B while a voltage on line 28 may indicate a value of "0" in digit B. The "1" line 22 of digit A is connected to AND circuits 30 and 32 while the "0" line 24 is connected to AND circuits 34 and 36, while the "1" line 26 is connected to AND circuits 30 and 36 and the "0" line 28 is connected to AND circuits 32 and 34. If both connections to an AND circuit contain a relatively high amplitude voltage then the AND circuit provides one output indication. The above described four AND circuits provide a high voltage indication on one of four output lines 38, 40, 42 or 44 corresponding to the value of the two binary digits A and B, and thus an indication of the number of binary 1's contained in the two digits. The four possible values of two binary digits are 0, 1, 2 and 3, which in binary is represented as 00, 01, 10, 11, respectively. From inspecting the binary representations, 01 and 10 have an odd number of 1's while 00 and 11 have an even number of 1's. Thus AND circuits 30 and 34 detect an even number of 1's while AND circuits 32 and 36 detect an odd number of 1's. By applying the outputs of AND circuits 30 and 34 on lines 38 and 42, respectively, to OR circuit 46, both cases of an even number of 1's will be indicated on line 48. Similarly, the outputs of AND circuits 32 and 36 on lines 40 and 44, respectively, are applied to OR circuit 50 to indicate both cases of an odd number of 1's on line 52.

It is apparent that an indication on line 48 (even number of 1's) can be conveniently referred to as a binary 0 in a single digit representation, and the indication on line 52 (odd number of binary 1's) can be referred to as a binary 1 in a single digit representation of an odd number of 1's. As a parity generator for an odd number of 1's the indication on line 48 would provide for a "1" parity bit to make the total number of 1's in the code odd, while when used as a parity generator for an even number of 1's the indication on line 52 must provide for a "1" parity bit to make the total number of 1's in the code even.

When the truth function is used to check a code to determine if correct parity is present, digits A and B are applied to the logic circuit of FIGURE 2 in the manner described with the output indications on lines 48 and 52 applied to AND circuits 54 and 56 respectively to detect coincidence with the parity indication on lines 58 and 60 for the 0 and 1, respectively, yielding an odd parity check. For an even parity check the indications on lines 58 and 60 may be interchanged. The presence of an output indication from either AND circuit 54 or 56 will show that parity checks all right. Lack of an output from both AND circuits 54 and 56 will indicate an error.

The building block module of this invention which performs the logic described for the logical circuit of FIGURE 2 is shown in dashed lined box 62 of FIGURE 3. Input binary digit A, is applied to module 62 on lines 64 and 66 which correspond to logic lines 22 and 24 respectively of FIGURE 2. Similarly, input binary digit B is applied to module 62 on lines 68 and 70 which correspond to lines 26 and 28, respectively, of FIGURE 2. The AND circuits 30, 32, 34 and 36 are embodied in the emitter-base junction of transistors 72, 74, 76 and 78, while the OR circuits 50 and 52 are embodied in the physical connections of the collector electrodes, as hereinafter explained.

It is well known that a transistor will present a low impedance between its collector and emitter if the semiconductor junction between the base and the emitter electrodes is forwardly biased. In the case of a NPN transistor, when the base electrode potential is positive with respect to the emitter electrode potential, a low impedance is presented to any current attempting to flow from the collector electrode to the emitter electrode. However, when the base electrode potential of such a transistor is relatively negative with respect to the emitter electrode potential, i.e., the junction is reverse-biased and no base current is flowing, the transistor will present a relatively high impedance to any current attempting to flow from the collector electrode to the emitter electrode.

As defined above the presence of a digital signal may be represented by a relatively high or positive voltage on a line with limitation thereto not being intended. Thus with a 1 signal on line 68 and a 1 signal on line 64 there will be relatively negative or low voltages on both lines 66 and 70. By inspection of the circuit 62, it is apparent that only transistor 72 will have current flowing from its base 80 to its emitter 82 and thus will be the only transistor in circuit 62 which presents a low impedance to current attempting to flow from the collector electrode to the emitter electrode. Thus the potential on collector electrode 84 is essentially clamped to the potential on emitter 82. Similarly, it can be shown that each transistor will provide such a low impedance to only one combination of inputs, as will become apparent from the following description.

The collector supply voltage for transistors 72 and 76 which have collector electrodes 84 and 86, respectively, may be supplied through a common supply resistor 88. It is apparent that the collector current for collector 84 may be applied through a variety of impedance devices. The voltage on line 90 will be relatively low at any time that either or both transistors 72, 76 present a low impedance to current flowing from +V through resistance 88 thence on line 90 to the collector electrodes 84 or 86, because the voltage on line 90 is essentially clamped to the emitter potentials of said transistors. Only when both transistors 72 and 76 present a high impedance will the voltage on line 90 become relatively positive and thus according to our arbitrary definition indicate the presence of a digital signal. The same reasoning can be applied to the voltage on line 92 which connects the collector electrodes of transistors 74 and 78 to resistance 94. Further inspection of circuit module 62 reveals that both transistors 72 and 76 present high impedances only when digit A is different from digit B, i.e., the number of binary 1's in the digits A and B are odd. Similarly, transistors 74 and 78 are both in the high impedance state only when both digits A and B are alike, i.e., both 0's or both 1's, thereby indicating an even number of 1's in the two digits. Table I below indicates the state of each transistor for all four possible inputs, "+" indicating a high impedance and "−" indicating a low impedance in the transistor.

*Table I*

| Binary Digit Value A | Voltage Ampl. on Lines | | Binary Digit Value B | Voltage Ampl. on Lines | | Impedance of Trans. | | Voltage Ampl. on Line 90 | Impedance of Trans. | | Voltages on Line 92 |
|---|---|---|---|---|---|---|---|---|---|---|---|
| | 64 | 66 | | 68 | 70 | 72 | 76 | | 74 | 78 | |
| 0 | lo | hi | 0 | lo | hi | + | − | lo | + | + | hi |
| 0 | lo | hi | 1 | hi | lo | + | + | hi | + | − | lo |
| 1 | hi | lo | 0 | lo | hi | + | + | hi | − | + | lo |
| 1 | hi | lo | 1 | hi | lo | − | + | lo | + | + | hi |

A relatively high amplitude or positive voltage on line 90, indicative of an odd number of 1's in the two digits, may be conveniently termed a binary 1 as a single 1 is an odd number of binary 1's. Similarly, the positive voltage on line 92, indicative of an even number of 1's, can be conveniently termed a binary 0, which is an even number of binary 1's (no 1's or both 1's).

In comparing the operation of the comparison circuit or module 62 with the logical diagram of FIGURE 2, it is apparent that there is signal inversion in module 62 because of the arbitrary selection of signal definitions and transistor types. However, by interchanging only the high and low voltage amplitudes on lines 64 and 66 from that in Table I, FIGURE 2 represents the exact logic of FIGURE 3, as may be seen by reference to Table II.

*Table II*

| Binary Digit Value A | Voltage Ampl. on Lines | | Binary Digit Value B | Voltage Ampl. on Lines | | Impedance of Trans. | | Voltage Ampl. on Line 90 | Impedance of Trans. | | Voltages on Line 92 |
|---|---|---|---|---|---|---|---|---|---|---|---|
| | 64 | 66 | | 68 | 70 | 72 | 76 | | 74 | 78 | |
| 0 | hi | lo | 0 | lo | hi | + | + | hi | − | + | lo |
| 0 | hi | lo | 1 | hi | lo | − | + | lo | + | + | hi |
| 1 | lo | hi | 0 | lo | hi | + | − | lo | + | + | hi |
| 1 | lo | hi | 1 | hi | lo | + | + | hi | + | − | lo |

Interchange of the high and low voltage amplitudes only on lines 68 and 70 results in the operation indicated in Table III, while interchange of the high and low voltage amplitudes on both pairs of lines 64, 66 and 68, 70 gives the results shown in Table IV.

*Table III*

| Binary Digit Value A | Voltage Ampl. on Lines | | Binary Digit Value B | Voltage Ampl. on Lines | | Impedance of Trans. | | Voltage Ampl. on Line 90 | Impedance of Trans. | | Voltages on Line 92 |
|---|---|---|---|---|---|---|---|---|---|---|---|
| | 64 | 66 | | 68 | 70 | 72 | 76 | | 74 | 78 | |
| 0 | lo | hi | 0 | hi | lo | + | + | hi | + | − | lo |
| 0 | lo | hi | 1 | lo | hi | + | − | lo | + | + | hi |
| 1 | hi | lo | 0 | hi | lo | − | + | lo | + | + | hi |
| 1 | hi | lo | 1 | lo | hi | + | + | hi | − | + | lo |

*Table IV*

| Binary Digit Value A | Voltage Ampl. on Lines | | Binary Digit Value B | Voltage Ampl. on Lines | | Impedance of Trans. | | Voltage Ampl. on Line 90 | Impedance of Trans. | | Voltages on Line 92 |
|---|---|---|---|---|---|---|---|---|---|---|---|
| | 64 | 66 | | 68 | 70 | 72 | 76 | | 74 | 78 | |
| 0 | hi | lo | 0 | hi | lo | − | + | lo | + | + | hi |
| 0 | hi | lo | 1 | lo | hi | + | + | hi | − | + | lo |
| 1 | lo | hi | 0 | hi | lo | + | + | hi− | + | − | lo |
| 1 | lo | hi | 1 | lo | hi | + | − | lo | + | + | hi |

Also, as will later be explained, if relatively negative voltages were chosen to represent the indication of binary 1's and 0's, or if PNP transistors were used with the arbitrarily selected positive voltage indication of binary signals, not only can the logic of FIGURE 2 be directly applied to module 62, but also the operational result in each of the above tables can be obtained. Further, as will be later apparent, if PNP transistors are used with relatively negative voltages indicating the binary signals, the same result as indicated in each of the above tables can also be obtained.

From the description of FIGURE 3, it is apparent that a relatively positive voltage indication on line 90 results from the coaction of transistors 72 and 76 in presenting a substantial impedance between their respective collector and emitter electrodes. It is also apparent in relation to Tables I and IV that a high impedance simultaneously in transistors 72 and 76 is caused when digit A is different from digit B, at which time line 90 has a positive voltage thereon. This can be compared with an odd indication on line 52 of FIGURE 2. Thus transistors 72 and 76 with their collector electrodes directly connected to line 90 can perform the functions of AND circuits 32 and 36 and OR circuit 50 of FIGURE 2. Similarly, transistors 74 and 78 with their collector electrodes tied directly to line 92 can perform the function of AND circuits 30 and 34 and OR circuit 46 of FIGURE 2 in providing indication of an even number of binary 1's in the input binary digits A and B.

The above operation in relation to Table I can be conveniently expressed in terms of algebraic logical equations wherein by arbitrary definition a binary one in digit A may be represented as $A_1$ while a binary 0 may be indicated by $A_0$; digit B can be similarly indicated. Since a high impedance from the collector electrode to the emitter electrode in two transistors connected in parallel is indicative of a logical resultant, only the equations for providing a high impedance in the transistor need be written:

$$72_+=B_0+(B_1)(A_0) \qquad (1)$$

where $72_+$ indicates transistor 72 is in the high impedance state, the plus sign on the right side of the equation is indicative of an inclusive OR function and the multiplication signs are indicative of a logical AND function. Equation 1 may be read that transistor 72 presents a high impedance at all times when input binary digit B is a binary 0 OR when input binary digit B is a 1 AND input binary digit A is a 0 ($A_0$). Similarly, equations for the other three transistors may be written.

$$74_+=A_0+(A_1)(B_1) \qquad (2)$$

$$76_+=A_1+(A_0)(B_1) \qquad (3)$$

$$78_+=B_0+(A_1)(B_1) \qquad (4)$$

Since an output signal voltage on either of lines 90 or 92 of FIGURE 3 require two transistors providing a high impedance state $$+90=(72_+)(76_+) \qquad (5)$$

where +90 indicates a relatively high or positive voltage on line 90 of FIGURE 3. Equation 5 may read: a relatively positive voltage appears on line 90 when both transistors 72 AND 76 present a high impedance between their respective collector and emitter electrodes.

Similarly $$+92=(74_+)(78_+) \qquad (6)$$

By substituting (1) and (3) in (5), $$+90=[B_0+(B_1)(A_0)][A_1+(A_0)(B_1)]$$

and by cross multiplication $$+90=(B_0)(A_1)+(B_0)(A_0)(B_1)+(B_1)(A_0)(A_1)+[(A_0)(B_1)]^2 \qquad (7)$$

Since the simultaneous occurrence of a binary 1 and a binary 0 in the same digit is invalid, since $1^2=1$, and the OR function is inclusive:

$$+90=(B_0)(A_1)+(A_0)(B_1) \qquad (8)$$

By substituting (2) and (4) in (6) and simplifying:

$$+92=(A_1)(B_1)+(A_0)(B_0) \qquad (9)$$

Equation 9 states that a relatively positive voltage on line 92 is indicative that the binary contents of digits A and B are alike, thus contain an even number of binary 1's, while Equation 8 states that the voltage on line 90 is indicative of an odd number of binary 1's in digits A and B. Similar logic can be applied to develop equations which are in accordance with the operation of Tables II, III and IV.

The operation of module 62 of FIGURE 3 utilizing relatively negative voltages for indication of binary code is now explained. It is apparent that in binary notation utilizing positive and negative voltages that a negative voltage is the complement of a positive voltage in the same manner that a binary 0 is the complement of a binary 1. By arbitrarily interchanging the definitions of lines 64 with 66, and 68 with 70 and by using relatively high amplitude negative voltages as an indication of information with relatively low amplitude negative voltages (or voltages that go positive) meaning no information, module 62 can operate with such negative voltage indications. Thus a relatively high negative voltage on line 64 indicates a binary 0 in digit A, and a high negative voltage on line 66 indicates a binary 1 therein; while a high negative voltage on line 68 indicates a binary 0 and a high negative voltage on line 70 indicates a binary 1 in digit B. The impedances presented by the transistors 72, 74, 76 and 78 are indicated in Table V below and may be compared with Table I for the positive voltage indications to note that the only change is in the definitions of the input binary values relative to the voltage amplitudes on lines 64, 66 and 68, 70.

*Table V*

| Binary Digit Value A | Voltage Ampl. on Lines | | Binary Digit Value B | Voltage Ampl. on Lines | | Impedance of Trans. | | Ampl. on Voltage Line 90 | Impedance of Trans. | | Voltages on Line 92 |
|---|---|---|---|---|---|---|---|---|---|---|---|
| | 64 | 66 | | 68 | 70 | 72 | 76 | | 74 | 78 | |
| 0 | hi | lo | 0 | hi | lo | + | − | lo | + | + | hi |
| 0 | hi | lo | 1 | lo | hi | + | + | hi | + | − | lo |
| 1 | lo | hi | 0 | hi | lo | + | + | hi | − | + | lo |
| 1 | lo | hi | 1 | lo | hi | − | + | lo | + | + | hi |

Thus the circuit operation is not changed; however, the output indication is complemented, i.e., the low or relatively negative voltage on line 90 indicates an even number of binary 1's as was the case in Table I but the input voltages for Table V are negative rather than positive. In like manner, the relatively negative voltage on line 92 indicates an odd number of binary ones in the two input binary digits A and B. From inspecting Table V it is clear that the relatively negative voltage indications result when either one of the two transistors connected to line 90 and 92, respectively, presents a low impedance, since the collector electrode potential is thereby essentially changed to the relatively negative potential on the emitter electrode.

An alternate comparison circuit or module 62' is illustrated in FIGURE 3A utilizing PNP transistors 72', 74', 76' and 78' and interconnected as the elements in module 62 are interconnected. As would be expected, the operation of alternate module 62' is the binary complement of module 62. That is, with positive voltage information indication, module 62' operates in the manner described for the negative voltage information indication operation of module 62. Thus, a positive voltage on line 64' is indicative of a binary 1 in digit A, while a positive voltage on line 68' is indicative of a binary 1 in digit B. Similarly, positive voltages on lines 66' and 70' indicate binary 0's in digits A and B, respectively. As a result of the inputs just described the output voltages on lines 90' and 92' will increase (i.e., become less negative and tend to be clamped to the positive input voltage on an associated emitter) to indicate an even and an odd number of binary 1's, respectively, in the two input binary digits 18 and 20. Note that with PNP transistors the collector supply voltage is relatively negative voltage as supplied through collector loads 96 and 98. Consider transistor 72'. If the potential on emitter electrode 100 is positive with respect to the base electrode 102 potential as when A and B are both 0's in a positive voltage designation, transistor 72' presents a relatively low impedance to any current tending to flow between collector electrode 104 and emitter electrode 100 so that line 90' moves to a relatively positive potential. Similarly, the other three transistors 74', 76' and 78' are controlled resulting in a circuit impedance behavior and output voltages like those indicated in Table V above. When the inputs of Table I are applied, with it being understood that high output voltages on lines 90 and 92 as indicated in Table V refer to relatively high negative amplitudes on lines 90' and 92', while the "lo" voltages refer to less negative or positive voltages on lines 90' and 92'. By rearranging the positive voltage binary signals on the input lines, three other modes of operation can be obtained.

In utilizing module 62' with negative voltage information indications, operation identical to the operation of module 62 is provided, except that where positive voltages appeared in module 62, relatively negative voltages now appear. Thus relatively negative voltages on lines 64' and 68' indicate binary 1's while negative voltages on lines 66' and 70' indicate binary 0's. The impedance behaviour of module 62' utilizing such relatively negative voltages is the same as that indicated in Table I above. Other tables corresponding to Tables II, III and IV can be made with a rearrangement of the negative voltages on the different input lines.

In any of the systems herein described it is to be understood that either of the comparison circuits or parity checking modules 62 or 62' may be used since, as indicated above, they are logical equivalents. Thus, where a block symbol indicates module 62, module 62' may be substituted therefor, of course, bearing in mind that the collector supply voltages are changed to correspond to the type of transistor being used and that definition of information content of voltages is complementary. The extent of changes necessary in the connections between the two types of modules and the data processing systems or digital registers will be explained later.

The parity circuit module 62 of FIGURE 3 may be applied to provide a parallel parity checker which does not require intermediate storage of parity signals nor storage of the information signals in the data system which is the source of the signals during the parity determination. In FIGURE 4 data system 116 operates by character, i.e., 6 information signals comprising a character are processed in parallel together with a parity signal. Such a data system is described in the application of Eckert et al., "Information Handling System," Serial No. 279,710, filed March 31, 1952. In transferring the information signals in parallel, at least a part of the signals are transferred to the parity circuit which includes circuit modules 118, 120, 122, 124, 126 and 128 plus switches 130, 132 and 134. The information contained in each binary digit is represented as above described by a positive pulse of one of two lines. In the 6-bit character, the information pulses are transferred from the data system 116 to the parity circuit via line pairs 136, 138, 140, 142, 144 and 146 indicating the least significant to the most significant digit of the binary code in the order listed. Parity circuit module 118 compares the signals on parallel binary input line pairs 136 and 138 wherein each line pair transfers signals indicative of a binary digit as described in FIGURE 3. For example, line 166 in line pair 136 carries the binary 0 signal while line 168 carries the binary 1 signal for module 118. These lines 166 and 168 can be compared with binary input lines 66 and 64, respectively, of FIGURE 3. Also, in like manner other line pairs referred to transfer signals as aforedescribed. The output of module 118 is applied to module 120 over one of the lines in pair 170 with the parity indication of an odd number of binary 1's on line pairs 136 and 138 being connected to the binary 1 input line of module 120, and the parity indication of an even number of binary 1's on line pairs 136 and 138 being connected by the other of the lines in pair 170 to the binary 0 input line of module 120 as described for FIGURE 3. For example the digit A input to FIGURE 3 may be compared to the parity output indication from module 118 being applied to the digit A input of module 120. Then line pair 140 carrying one bit of the parallel binary code to be checked is comparable to input digit B of FIGURE 3. The remaining circuit modules are so interconnected; that is, the signals on line pairs 142, 144 and 146 are so fed into modules 124, 126 and 128, respectively, and compared in the aforedescribed manner with the parity indication from the less significant digits of the codes.

The line pairs 170, 172, 174 and 176 respectively carry the results of a comparison to one input of the next module with a 1 signal indicating an odd number of 1's in the signals compared and a 0 an even number of 1's. That is, if the digits in the $2^0$ and $2^1$ digit positions are different, a 1 output signal will result on line pair 170. Then if the $2^2$ digit is a 1, comparison in module 120 causes a 0 output signal on line pair 172, etc. The signal on line pair 148, then, is indicative of an even or odd number of binary 1's in the six information signals, and thus in an odd parity check is indicative of the binary complement of what the parity signal should be, while in an even parity check is the same as what the parity signal should be.

When the described circuit is being used for checking the parity signal of information signals being transferred in system 116, switches 132 and 134 are in their illustrated position, i.e., contact their lower terminals 150 and 152 respectively. With switch 132 in such a position, a positive enable on line 151 is provided to system 116 over line 153 to indicate that the parity signal associated with the six information signals just discussed should be presented to module 128 over line pair 154 as hereinabove described. When so presented the parity signal is compared with the signal on line pair 148 and provides either a positive signal on line 156 indicative of a total of binary 1's which is even, or a positive signal on line 158 indicative of an odd number of binary 1's. All of the just described activity occurs simultaneously with a very slight signal delay of no consequence through the parity circuit modules 118, 120, 122, 124, 126 and 128. Since the output signals of one module are directly connected to the input lines of the next module, it is apparent that the action of the parity circuit is almost instantaneous in nature.

With switch 130 in the position illustrated so as to contact terminal 159, the signal on line 156 is passed to switch 134 where it is routed to terminal 152. With switch 130 in the position shown, an odd parity system is being used. Any positive signal on line 156 indicates an even number of binary 1's in a word including its parity bit and in an odd parity system is thus indicative of a detected error. Such a signal is routed to the data system 116 via line 155 to indicate said detected error. With no error there is a signal on line 158 which is dead-ended. Thus with no error detected, no indication signal is provided to data system 116. With switch 130 switched to terminal 160 an even parity check is being utilized and a signal on line 158 is indicative of a detected error. Thus there is illustrated a parallel parity checking circuit which does not delay the transmission of information in the data system 116.

The advantage of providing an indicative signal only on the detection of an error is that without the detected error, the data system 116 need not wait for the indication of error, while with an error signal operation of the data system is stopped or otherwise indicates the presence of an error in conventional fashion to allow an operator to find the source of the fault. However, it is to be understood that the parity checking circuit of this invention is sufficiently rapid in response to a plurality of information signals that systems requiring a positive indication of no error detected could operate without delaying the transfer of information and still check parity.

In applying the circuit of FIGURE 4 to provide a parity signal generator, switches 132 and 134 are both switched to terminals 162 and 164, respectively. Assuming that an odd parity check system is being used switch 130 is in the illustrated position. The positive enable is routed to line 161 by switch 132 via terminal 162 to provide an indication to system 116 that a voltage indication of a binary 0 is to appear on line pair 154 at all times. With terminal 150 disconnected from the positive enable, data system 116 is informed that any signal appearing where the parity signal normally appears will be blocked. In this arrangement with the six information signals being fed to the parity circuit as heretofore described, the signal on line pair 148 is indicative of the complement of the desired parity signal. When this complement of the desired parity signal is compared with the continuous 0 signal on line pair 154, the complement indication is not changed. Thus a positive signal on line 156 (which indicates an even number of binary 1's), will be indicative in an odd parity system that a 1 parity signal must be added to the six information signals forming the indication on line pair 148 and as such is routed over line 165 by switch 134 via terminal 164 to signal receiving means (such as a flip-flop or amplifier—not shown) in data system 116 to form a signal indication of a binary 1 for the parity bit. In absence of a signal, a binary 0 is inserted as a parity bit.

Similarly, if an even parity is being used, switch 130 connects terminal 160 to switch 134 and the positive signal on line 158, which indicates that the number of binary 1's in the six information bits is odd, is routed to terminal 164 to indicate that the parity signal should be a binary 1—making the total number of one's in the six information bits and parity bit even. In the absence of a signal a binary 0 is made the parity bit.

Reference is now made to the substitution of module 62' of FIGURE 3A for module 62 in the system illustrated in FIGURE 4. First the input circuitry to the parity checking circuit will be discussed. Line pair 136 will be described, however, the discussion applies directly to all other line pairs in FIGURE 4. As previously indicated for module 62, line 166 in line pair 136 carries the binary 0 signal while line 168 carries the binary 1 signal for module 62. These lines 166 and 168 can be compared with binary input lines 66 and 64, respectively, of FIGURE 3. For substitution of module 62' for module 62 in the parity checking system of FIGURE 4 without changing the voltage definitions of data system 116, lines 166 and 168 are interchanged as are all lines in each line pair including line pairs 138, 140, 142, 144, 146, 154, 170, 172, 174, 176 and 148, and lines 156 and 158 are interchanged by switch 130. In addition to the above interchanges, the collector supply voltage (not shown in FIGURE 4) is also changed from a positive supply voltage to a negative supply voltage. In addition, the positive enable on switch 132 is changed to a negative enable. It is apparent from the description of the operation of module 62' of FIGURE 3A that the operation of the circuit using positive voltage signal indications is complementary to the operation of module 62 of FIGURE 3 with the positive voltage signal indications, thus all inputs and outputs of all modules are complemented by interchanging the lines in each line pair, as abovementioned. This in effect complements the inputs and outputs of each module thereby restoring the operation to the previous definition. That is, since the complementing of a binary complement of a binary code or representation produces the original binary code or representation, the operation of complementary module 62' of FIGURE 3A with complemented interconnections causes the input and output signal indications of the parity circuit of FIGURE 4 to be identical to the inputs and outputs obtained when module 62 of FIGURE 3 is used.

Figure 5:
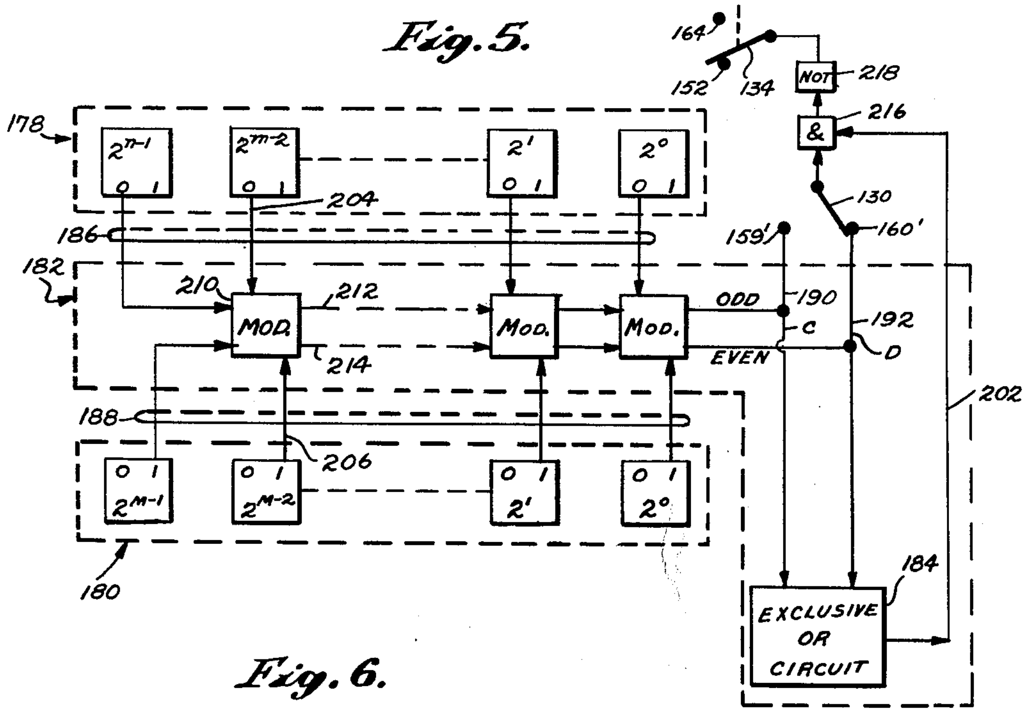
FIGURE 5 is a block diagram of a parity checking circuit which performs a bit comparison of two signal representations of an information word simultaneously with parity checking thereof.

FIGURE 5 illustrates another exemplary embodiment of this invention in providing parity functions combined with bit comparisons of two independent signal representations of the binary code to be checked. For purposes of simplicity two static flip-flop registers 178 and 180 each of modulo $2^n$ for representing the same word including at least one parity bit are shown as character sources for checking circuit 182 which includes EXCLUSIVE OR circuit 184 and a plurality of parity module circuits 62 or 62'. The binary 0 signals are fed from register 178, which contains the signals representing the first of two independent representations of the binary code to be checked, to each module on the binary 0 input line, such as line 70 in FIGURE 3. The binary 1 signals of the binary code to be checked are fed from register 180, which contains the second of two independent representations of said binary code, to each parity circuit module on the binary 1 input line, such as line 68 of FIGURE 3. The line pairs 136, 138, 140, 142, 144, 146 and 154 of FIGURE 4 correspond to the 0 binary lines 186 and the 1 binary lines 188 of FIGURE 5. It is apparent that the two character sources 178 and 180 may be a component part of data system 116 of FIGURE 4. The parity operation of circuit 182 is identical to that described for the parity circuit of FIGURE 4 with the odd number of 1's being indicated on line 190 and the even number of 1's being indicated by a signal on line 192. By adding EXCLUSIVE OR circuit 184 and connecting the parity indication lines 190 and 192 to the inputs of circuit 184, a bit comparison check is provided.

Figure 6:
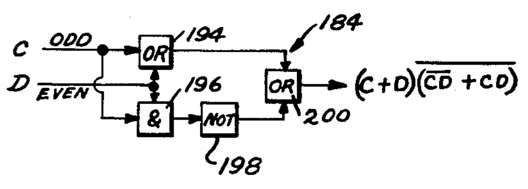
FIGURE 6 is a truth function diagram of an EXCLUSIVE OR circuit.

The operation of any EXCLUSIVE OR circuit, such as the one in FIGURE 5, is illustrated by the logic diagram of FIGURE 6. The presence of a signal represents a quantity, while absence of signal indicates the binary complement of that quantity, i.e., binary 1 and 0 respectively. The function of an EXCLUSIVE OR circuit is to provide an indication that either one of the two input signals is present, but not both or neither, i.e., to indicate when only one of the input signals is present. With the two input signals C and D, such as may appear on lines 190 and 192 of FIGURE 5, applied simultaneously to OR circuit 194 and AND circuit 196 which feeds NOT circuit 198, the output of OR circuit 200 will indicate that either C OR D but NOT C AND D are present at the inputs. Also, NOT C and NOT D would produce no output as no signal would be presented to the inputs. Apparatus to provide EXCLUSIVE OR circuits are well known in the computer art.

Referring again to FIGURE 5 it is apparent that, if the parity circuit and the two registers or character sources 178 and 180 have the correct signals therein, i.e., if the digit order bits correspond, either line 190 or 192 will have an indicative signal thereon, and consequently, EXCLUSIVE OR circuit 184 will cause an indicative signal on line 202. However, if any bit represented in register 178 is different from the corresponding bit in register 180, both lines 190 and 192 will both have either a relatively positive voltage or a relatively negative voltage thereon. Thus with either two indicative signals or with no indicative signals on said lines 190 and 192, the EXCLUSIVE OR circuit 184 will not provide an indicative signal on line 202 as it would if only one of said lines 190 and 192 had an indicative signal thereon. Thus lack of a signal on line 202 is indicative that the signal representation in register 178 is not identical to the signal representation in register 180. As will be later explained, a parity indication, such as positive signals on both lines 190 and 192, could still indicate a valid parity check in either an even or odd check system if it were not for the EXCLUSIVE OR circuit 184.

The same indication occurs on both lines 190 and 192, i.e., relatively high voltage signals on both lines or relatively low voltage signals on both lines, when two corresponding bits in registers 178 and 180 are different, for the following reasons. Again refer to FIGURE 3 and assume that the input digit B is providing an indication that is relatively positive on both lines 68 and 70. Thus in digit B there is indicated the presence of both a binary 1 and a binary 0. Thus all base electrodes of transistors 72, 74, 76 and 78 will have a relatively positive voltage thereon. Regardless of the input voltage indications of digit A on line 64 and 66, at least transistors 72 and 74 or transistors 76 and 78 will present a low impedance to any current tending to flow from their respective collector electrodes to their respective emitter electrodes. Thus a low or relatively negative voltage will always appear on both lines 90 and 92. If these two relatively negative voltages on both lines 90 and 92 are inputs to a second parity module circuit, such as circuit 62, for example on binary input lines 64 and 66, then the output of the said second parity circuit module will also be relatively negative. Referring now to FIGURE 5 assume that the $2^{n-2}$ digit positions in registers 178 and 180 are unalike, thus the output on line 204 is identical to the output on line 206. If both lines 204 and 206 are positive, then the output indication of module 210 on both lines 212 and 214 will be negative and this negative voltage will be propagated to lines 190 and 192. In this case there will be no indication on either line 190 and 192 of a valid parity check.

However, if the voltage indication on lines 204 and 206 is low or relatively negative, as would be the case in FIGURE 3 with low or relatively negative voltages on lines 68 and 70, then the output indication would be a high or relatively positive voltage on both lines 90 and 92 of FIGURE 3 which correspond to lines 212 and 214 of FIGURE 5. This relatively positive voltage is propagated to lines 190 and 192 as follows: Assume that in FIGURE 3 the voltage indications of digit A on lines 64 and 66 are both positive as a result, for example, of positive voltages on both output lines from the preceding module. In FIGURE 5 this corresponds to the voltage indications transferred from one modular circuit to the next toward lines 190 and 192 from modular circuit 210. If both lines 64 and 66 of FIGURE 3 contain thereon positive voltages, then all four emitter electrodes of the four transistors 72, 74, 76 and 78 have relatively positive voltages thereon. Since the base voltages of all said four transistors are either negative with respect to the emitter electrode voltage or substantially the same as said emitter voltages, then all of said four transistors will present a relatively high impedance to any current tending to flow from their respective collector electrodes to their respective emitter electrodes. When this is the case both lines 90 and 92 will have a relatively positive voltage thereon. Since these said lines correspond to lines 212 and 214 in FIGURE 5, it is apparent that the relatively positive voltage will be propagated to both lines 190 and 192 regardless of the binary input signals from the digit signal sources between the error and the lines 190 and 192. When a positive voltage on one of lines 190 and 192 is to be indicative of an even or odd parity, such would be indicated as well when both lines 190 and 192 are positive due to an error in the registers' representations, if it were not for the EXCLUSIVE OR circuit 184 which, as above mentioned, will indicate the error by providing no output signal on line 202 when both lines 190 and 192 are positive.

The circuit of FIGURE 5 can be employed with the data system of FIGURE 4 to either generate the proper parity signal or provide an error signal if the parity bit associated with a word is wrong, in either an even or odd parity system by connecting the output of switch 130 to AND circuit 216 the other input to which is the output on line 202 from EXCLUSIVE OR circuit 184. The output of the AND circuit is then coupled to switch 134 through NOT circuit 218. The operation is then the same as previously indicated except that switch terminal 159', which when contacted by switch 130 indicates operation in an odd parity system, is connected to line 190, a signal on which indicates an odd number of 1's, rather than being connected to an even number indicating line as is terminal 159 in FIGURE 4. In like manner, switch terminal 160' for even parity operation is connected to line 192 to receive indications of an even number of 1's rather than an odd number as does terminal 160 in FIGURE 4.

From the discussion of FIGURE 5, it is apparent that several types of errors may occur in the representations of a word. For example, there are errors which involve transposition of bits. If transposition occurs in only one of the registers, it is apparent that an even number of errors (two) have occurred. Errors of this type will be indicated by the lack of an indicative signal from EXCLUSIVE OR circuit 184. However, if transposition occurs as between the same digit positions in both registers, no error indication will be made even though an even number of total errors has been made, since bit comparison is effective to indicate errors only when an even number of errors occurs in one register only.

Another type of error which can be detected by the circuit of FIGURE 5 is an odd number of errors in either one of the registers. This occurs, for example, when all the bits in the two registers correspond but there is an incorrect bit in the same position in both registers such as when both registers indicate a 1 in a given position whereas they both should indicate a 0. Then, there is only one error in each register and the EXCLUSIVE OR circuit 184 is of no avail in detecting such errors. However, this type of error will be indicated by a signal from NOT circuit 218.

As described hereinbefore the circuit of FIGURE 3A behaves in a manner which is the binary complement of the circuit of FIGURE 3. Thus by inspection of FIGURE 3A it can be easily seen that if the inputs to digit B on lines 68' and 70' are both relatively positive, there will be a relatively negative voltage on both lines 90' and 92', while when both lines 68' and 70' have relatively negative voltages both lines 90' and 92' will have relatively positive voltages thereon.

Similarly in digit A, when lines 64' and 66' both have relatively positive voltage thereon, then lines 90' and 92' with both have relatively positive voltages thereon, and when both lines 64' and 66' have relatively positive voltages thereon, both lines 90' and 92' will have relatively negative voltages thereon. It is apparent that the inputs in digit A on lines 64' and 66' will be propagated to the output lines 90' and 92', and thus, to the succeeding modular circuit in the same manner as the circuit of FIGURE 3 caused the identical voltages to be propagated to lines 190 and 192 in FIGURE 5.

There is consequently effectively provided in FIGURE 5 a checking circuit for checking both the parity and providing a bit-by-bit comparison of two signal representations of a binary code to be checked, with the checking circuit being capable of utilizing either of the two comparison circuits 62 or 62' of FIGURES 3 and 3A, respectively, and of utilizing any binary signal voltage representations.

Thus it is apparent that there is provided by this invention systems in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A circuit for indicating the parity of a binary word having $n$ digit orders when the digit in each order is represented by a pair of simultaneous different level signals, comprising $(n-1)$ tandemly connected signal comparison circuits, the last-in-line one of those circuits having at least one signal output with the remaining said circuits having a pair of signal outputs, each of said $(n-1)$ circuits having a first pair of signal inputs for receiving respective signals from the pair of outputs of the next preceding one of said $(n-1)$ circuits with the said first pair of signal inputs for the first-in-line of the said $(n-1)$ tandemly connected circuits being for the purpose of receiving the said pair of different level signals of one of the first and last orders of the said digit orders of said binary word, said $(n-1)$ circuits each having a second pair of signal inputs for respectively receiving the said pairs of different level signals of the rest of said binary word orders in corresponding digit order, and means in each of said $(n-1)$ circuits intracoupling the said inputs and outputs thereof for effecting a comparison between the signals received at its said first and second pairs of inputs to cause a signal at the output of the said last-in-line comparison circuit indicating the parity of said binary word.

2. A circuit as in claim 1 wherein each of at least the said remaining comparison circuits comprises four AND circuits and two OR circuits, each of said AND and OR circuits having two input terminals and an output terminal, the output terminals of the OR circuits being the aforesaid outputs of the respective said remaining comparison circuits, means for coupling the output terminals of two of said AND circuits respectively to the input terminals of one of the said OR circuits, means for coupling the output terminals of the other two AND circuits respectively to the inputs of the other OR circuits, means for coupling the aforesaid first pair of inputs of the respective comparison circuit to one of the said input terminals of each AND circuit, and means for coupling the aforesaid second pair of inputs of the respective comparison circuit to the other input terminal of each said AND circuit.

3. A circuit as in claim 1 wherein each of the comparison circuits includes a plurality of AND circuits and a plurality of OR circuits intercoupled in a predetermined manner, said inputs being coupled to said AND circuits and said outputs to the OR circuits.

4. A circuit as in claim 3 wherein each of said AND circuits includes a base-emitter junction of a transistor.

5. A circuit as in claim 1 and further including another comparison circuit with four inputs and an output means, said last comparison circuit having two outputs coupled to two of the inputs of said another comparison circuit, and means including means coupled to the output means and the other inputs of said another comparison circuit for automatically generating a parity signal for said binary word.

6. A circuit as in claim 5 wherein during the generation of a parity signal, a given binary signal is continually coupled to the said other inputs of said another comparison circuit.

7. A circuit as in claim 1 wherein said binary word includes a parity digit, and further including another comparison circuit with four inputs and an output means, said last comparison circuit having two outputs coupled to two of the inputs of said another comparison circuit, and means for coupling a signal representing the parity digit to the remaining inputs of said another comparison circuit for checking the parity of said binary word.

8. A circuit as in claim 7 and further including means for indicating an error in the parity of said binary word.

9. In a data system having $n$ binary digit orders including a parity digit order wherein the digit in each order is represented by a relatively high amplitude voltage on a first line for a binary 1 and a relatively high amplitude voltage on a second line for a binary 0, each of said lines having a relatively low amplitude voltage when the other line has a relatively high amplitude voltage, $n-1$ comparison circuits each having four inputs and two outputs, means for coupling the first and second lines for one digit order to the first and second inputs of one of said comparison circuits, means for coupling the first and second lines for another digit order to the third and fourth inputs of said one comparison circuit, means for coupling the comparison circuits successively including means coupling the output of each comparison circuit respectively to the first and second inputs of another comparison circuit, and means coupling the first and second lines for the remaining digit orders respectively to the third and fourth inputs of the remaining comparison circuits, the arrangement being such that a given signal resulting after the $n-1$ comparisons at one of the two outputs of the comparison circuit last in the succession thereof indicates an even number of binary 1's in the different digit orders while an odd number of 1's is indicated when said given signal is present at the other of the two outputs of the last comparison circuit.

10. A circuit for indicating the parity of a binary word having a plurality of digit orders each represented in first and second registers, comprising a plurality of comparison circuits each having four inputs and two outputs, means for coupling the outputs of each comparison circuit to two inputs of a successive comparison circuit, means for coupling a signal from one of the digit orders of one of said registers to one input of the first comparison circuit, means for coupling a signal representing said one digit order from the other of said registers to the second input of the first comparison circuit, means respectively coupling a signal representing the digits in the respective remaining orders of said binary word in the first register to the third input of said comparison circuits respectively, and means for coupling the signals representing the remaining orders of said binary word in the second register to the fourth inputs of the comparison circuits respectively, the arrangement being such that a given signal occurring at one of the outputs of the last comparison circuit indicates an odd number of binary 1's in said binary word, while said given signal on the other output of the last comparison circuit indicates an even number of binary 1's in said word.

11. A circuit as in claim 10 and further including an exclusive OR circuit coupled to the outputs of said last comparison circuit for providing an indicative signal only when the binary representation of said word in the first register is the same as the binary representation of said word in the second register.

12. A circuit for indicating the parity of a binary word having $n$ digit orders when the digit in each order is represented by a pair of simultaneous different level signals having a first level on a first output line and a simultaneous second and different level on a second output line when the digit is of one binary sense, and vice versa for the other binary sense, comprising means including $n$ pairs of the aforesaid first and second output lines for respectively supplying said pairs of different level signals as aforesaid for $n$ different digit orders, $(n-1)$ signal comparison circuits, one of said circuits having four signal input terminals and at least one signal output terminal with the remaining said circuits each having four signal input terminals and two signal output terminals, means in each of said $(n-1)$ circuits intra-coupling the input and output terminals thereof for effecting a comparison of signals received at its four input terminals and providing an appropriate output, means tandemly coupling the $(n-1)$ circuits so that the said two output terminals of each of the said remaining output circuits are coupled respectively to the first and second input terminals of the next-in-line one of said $(n-1)$ circuit means, means including the aforesaid first and second lines of the $n$th and $(n-1)$th digit orders for respectively coupling same to the four input terminals of the first-in-line one of said $(n-1)$ circuits, the $n$th digit order being one of the first and last digit orders of the said $n$ orders, and means including the aforesaid first and second lines of each of the remaining digit orders for respectively coupling those orders to the third and fourth inputs of the rest of said $(n-1)$ circuits for causing a signal at the output of the said last-in-line comparison circuit to indicate the parity of said binary word.

References Cited in the file of this patent

UNITED STATES PATENTS

| | | |
|---|---|---|
| 2,694,801 | Bachelet | Nov. 16, 1954 |
| 2,719,959 | Hobbs | Oct. 4, 1955 |
| 2,783,453 | Rose | Feb. 26, 1957 |
| 2,837,732 | Nelson | June 3, 1958 |
| 2,844,309 | Ayres | July 22, 1958 |
| 2,848,607 | Maron | Aug. 19, 1958 |
| 2,901,640 | Steinman | Aug. 25, 1959 |